(12) United States Patent
Tellier et al.

(10) Patent No.: US 9,987,781 B2
(45) Date of Patent: Jun. 5, 2018

(54) COATING OF A TURBINE ENGINE PART BY OVERINJECTION

(71) Applicants: SAFRAN, Paris (FR); SNECMA, Paris (FR)

(72) Inventors: Florian Tellier, Moissy-Cramayel (FR); Olivier Foussard, Etiolles (FR)

(73) Assignees: SAFRAN, Paris (FR); SNECMA, Paris (FR)

( * ) Notice: Subject to any disclaimer, the term of this patent is extended or adjusted under 35 U.S.C. 154(b) by 205 days.

(21) Appl. No.: 14/903,261

(22) PCT Filed: Jul. 9, 2014

(86) PCT No.: PCT/FR2014/051757
§ 371 (c)(1),
(2) Date: Jan. 6, 2016

(87) PCT Pub. No.: WO2015/004384
PCT Pub. Date: Jan. 15, 2015

(65) Prior Publication Data
US 2016/0136855 A1 May 19, 2016

(30) Foreign Application Priority Data
Jul. 11, 2013 (FR) ..................... 13 56820

(51) Int. Cl.
*B29C 45/14* (2006.01)
*B29L 31/00* (2006.01)
*B29C 45/56* (2006.01)

(52) U.S. Cl.
CPC .. *B29C 45/14065* (2013.01); *B29C 45/14631* (2013.01); *B29C 45/56* (2013.01);
(Continued)

(58) Field of Classification Search
CPC ............ B29C 45/1635; B29C 45/1639; B29C 45/14786; B29C 2045/14163; B29C 2045/14139; B29C 2045/14081
See application file for complete search history.

(56) References Cited

U.S. PATENT DOCUMENTS 4,783,298 A * 11/1988 Oda .................... B29C 37/0028
118/37
5,057,257 A  10/1991 Neitzke
(Continued)

FOREIGN PATENT DOCUMENTS

JP          63-274521      * 11/1988

OTHER PUBLICATIONS

International Search Report with English Language Translation, dated Sep. 30, 2014, Application No. PCT/FR2014/051757.
(Continued)

*Primary Examiner* — Jill L Heitbrink
(74) *Attorney, Agent, or Firm* — Womble Bond Dickinson (US) LLP

(57) ABSTRACT

The invention relates to equipment (1) for manufacturing a part (2) by injection moulding, including: a first cavity (10), a second cavity (20), and a supporting element (30), shaped such as to hold the part (2) in position in the equipment, and defining, together with the cavities (10, 20), an inner space of the equipment, the holding element (30) as well as the first cavity (10) and/or the second cavity (20) being movable relative to one another.

9 Claims, 2 Drawing Sheets

(52) U.S. Cl.
CPC .............. *B29C 2045/14163* (2013.01); *B29L 2031/7504* (2013.01)

(56) References Cited

U.S. PATENT DOCUMENTS

2012/0228799 A1* 9/2012 Stanley .................. B29C 45/64
  264/259
2013/0320588 A1* 12/2013 Habraken ........... B29C 45/0005
  264/257

OTHER PUBLICATIONS

French Search Report, dated Jan. 10, 2014, French Application No. 1356820.

* cited by examiner

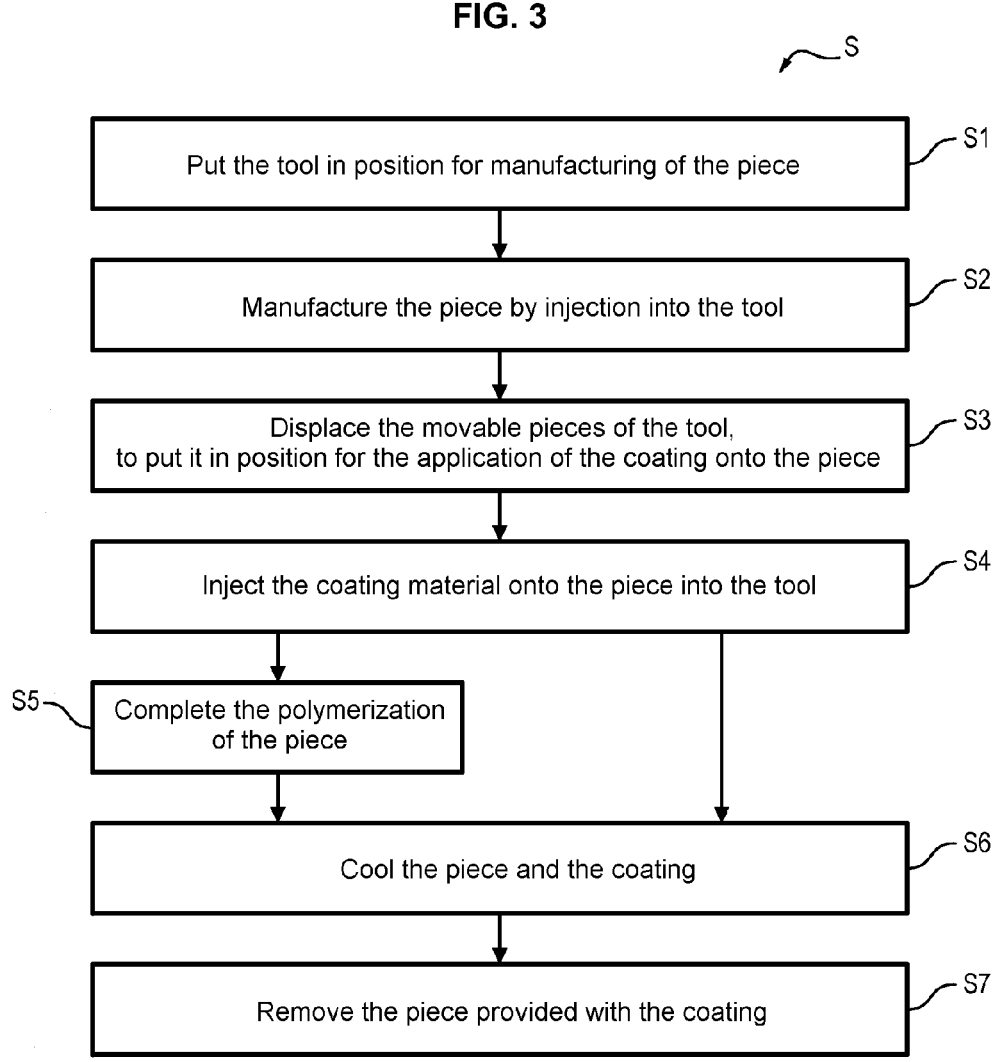

COATING OF A TURBINE ENGINE PART BY OVERINJECTION

FIELD OF THE INVENTION

The invention relates in a general manner to gas turbine engines, and more specifically the application of a protective coating to the surface of pieces belonging to such engines, particularly vanes or casings made of composite material.

TECHNOLOGICAL BACKGROUND

A gas turbine engine typically includes a nacelle that forms an opening to allow a determined stream of air to enter into the engine itself. The turbojet comprises a fan, adapted for providing initial compression of the air entering the engine, and one or more sections compressing the air allowed into the engine (generally a low-pressure section and a high-pressure section). The air thus compressed is allowed into the combustion chamber and mixed with fuel before being burned therein. The hot combustion gases arising from this combustion are then relaxed in different turbine stages (generally a low-pressure section and a high-pressure section).

Certain pieces of the engines comprise a protective surface coating in order to protect them from the environment. Typically, pieces made of composite material, for example comprising a fiber reinforcement densified by a polymer matrix, are usually covered on their surface with a protective coating in order to meet the requirements for resistance to the engine environment. Such composite material pieces can have complex geometry and can in particular comprise static vanes (guide vanes of the fan), movable vanes (fan vanes), or else casings, which complicates the application of their coating.

Currently methods for applying surface coatings to these different pieces are hard to reproduce. Specifically, these methods usually consist in gluing a protective film, for example a vulcanized polyurethane film, onto the surface to be protected. However, the thickness of the film and the glue is very hard to control, particularly by reason of the complicated geometry of the pieces, so that the dimensions of the final piece can vary greatly from one piece to the next. Moreover, their surface must be prepared beforehand for gluing the film by abrasion, specifically because of the material forming these pieces, which has a tendency to locally degrade the piece, to reduce the reproducibility of the method even further, and to increase the cost and duration of the method.

The choice of glue to be used is moreover made difficult insofar as the glue must observe two sometimes contradictory conditions. A first condition is that the glue must be able to be employed at a lower temperature in order not to damage the piece, and have an overall use temperature of less than a hundred degrees to avoid the matrix, generally made of polymer, degrading in the heat. A second condition is that the glue must have the highest properties possible, i.e. a degree of cross-linking approaching 100% in order to exhibit adequate mechanical properties of adhesion. It is therefore necessary to find a compromise between the preservation of the piece (lowest possible use temperature) and the properties of the glue (high temperature) to obtain optimal performance for the final piece, which in practice turns out to be difficult.

Finally, these known methods have the drawback of being polluting and requiring many expensive and bulky tools in order to observe environmental regulations concerning the protection of the operator, the limitation of volatile substances in the atmosphere etc.

It has also been proposed to apply the coating onto the piece by spraying material in the form of a paint. However, this method also requires the surface of the piece to be protected to be prepared beforehand (abrasion, reduction of surface defects by application of products intended to block the surface pores etc.), then a pre-layer to be applied in order to improve the adhesion of the paint onto the piece surface. However, each of these steps requires the employment of adapted spray guns. Moreover, the drying time of the various treatments must be observed and the piece surface must be sanded between each application. Finally, the method must be performed in controlled conditions, in order to control the temperature, hygrometry, and the level of volatiles in the atmosphere as well as the pollution risks.

The document U.S. Pat. No. 5,057,257, meanwhile, proposes a tool in accordance with the introduction of Claim 1. However, this tool does not make it possible to apply a protective coating to a surface of a piece that is easily reproducible.

SUMMARY OF THE INVENTION

An aim of the invention is therefore to propose a method for applying a protective coating to a surface of a piece which is easily reproducible, in particular making it possible to obtain a given thickness for the coating, and which guarantees good cohesion between the piece to be protected and its coating, without risking damage onto the piece, while being of moderate cost, simpler and faster to make, and more environmentally friendly.

To do this, the invention proposes a tool for manufacturing a piece by injection molding, specifically a piece made of composite material comprising a fiber reinforcement densified by a matrix, the tool comprising:

a first impression, adapted for molding a first face of the piece, and a second impression, adapted for molding a second face of the piece, The tool being characterized in that:

it further comprises an element for holding the piece, adapted for holding the fiber reinforcement of the piece in position into the tool, the first impression, the second impression and the holding element together defining an inner volume of the tool, and the holding element and at least one of the first impression and the second impression are movable in relation to one another, in such a way as to modify the inner volume of the tool between a molding position, in which the piece is manufactured into the tool, and a coating position, in which the coating is injected in said tool onto the piece thus manufactured, the fiber reinforcement of the piece being held in position by the holding element into the tool whatever the molding position.

Some preferred but non-limiting features of the tool described above are as follows:

the holding element is in sealing contact with the first impression and the second impression whatever the molding position, and in that the first impression and the second impression are movable in relation to one another and the holding element is fixed into the tool, in such a way as to modify the inner volume of the tool.

the first impression comprises at least a first sealing face, the second impression comprises at least a second sealing face, and the holding element comprises at least a wall, extending facing the first sealing face and the second sealing face, the first sealing face and the second sealing face being in continuous contact with the wall facing the holding element, whatever the relative position of the holding element and said impressions, the tool further comprises at least one seal extending between each sealing face and the wall facing the holding element, at least one of the first impression and the second impression is movable in relation to the holding element between the position of molding of the piece, in which said impression is abutting the holding element, so that the inner volume of the tool is minimal, and the position of coating of the piece, in which said impression is moved away from the holding element, so that the inner volume of the tool is greater than its minimal volume, the track of the impression being limited by an outer end stop, the tool further comprises a return means adapted for applying a force to the impression, which is movable in relation to the holding element, in order to displace said impression from its molding position to its coating position, the first impression and the second impression each comprise a housing adapted for at least partly receiving the holding element, the return means being a spring housed in an orifice of the housing of the impression movable in relation to the holding element, and the tool further comprises a member configured to apply a force to the impression movable in relation to the holding element, said force being in the opposite direction to a force of the return means in order to displace said impression from its coating position to its molding position.

The invention also proposes a method for manufacturing a piece by injection molding in a tool as described above, particularly of a piece made of composite material comprising a fiber reinforcement densified by a matrix, the method comprising the following steps:

manufacturing the piece by injection molding into the tool, the first impression, the second impression and the holding element being in position for the manufacturing of the piece, displacing at least one of the first impression and the second impression and/or the holding element in order to modify the inner volume of the tool, and create between the piece obtained following the manufacturing step and the tool a non-zero space, and injecting onto the piece in the space the constituent material of the coating.

A preferred but non-limiting feature of the method described below is that during the displacement step, the first impression and/or the second impression is displaced, the holding element and the piece remaining fixed into the tool.

BRIEF DESCRIPTION OF THE DRAWINGS

Other features, aims and advantages of the present invention will become more apparent upon reading the following detailed description, and with reference to the appended drawings given by way of non-limiting examples and wherein:

FIG. 3 is an organization diagram representing different steps of an exemplary embodiment of the method for manufacturing a piece in accordance with the invention.

DETAILED DESCRIPTION OF AN EMBODIMENT

Figure 1:
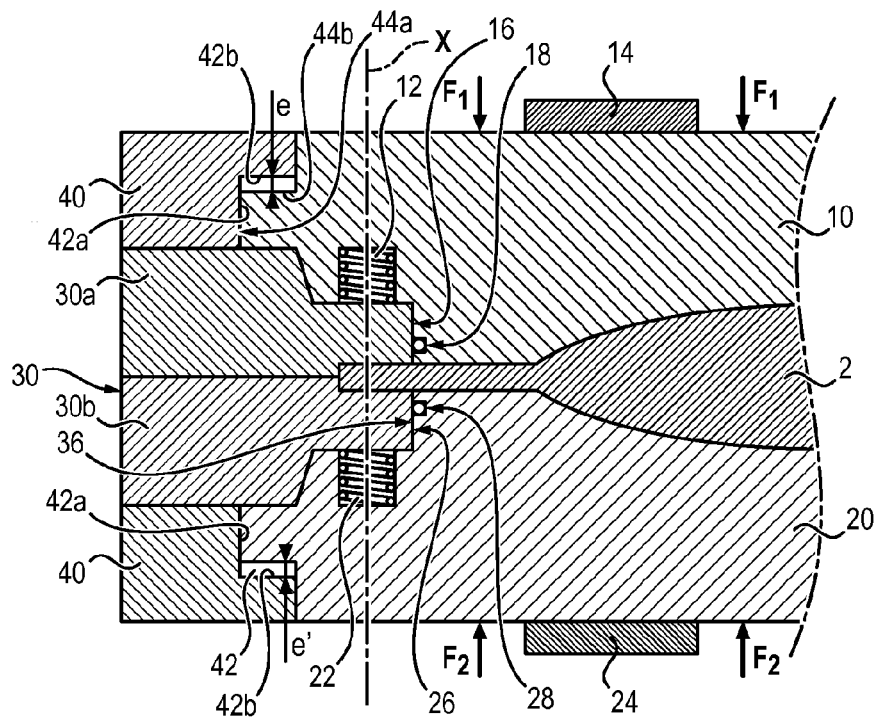
FIG. 1 is a schematic section view of an exemplary embodiment of a tool in the initial position in order to manufacture a piece.

In the following, the invention will be described more specifically in the context of the manufacturing S by injection molding of a piece 2 of a gas turbine engine, including a composite material comprising a fiber reinforcement densified by a matrix, one surface of which is covered by a protective coating 3. This is however not limiting, insofar as the invention also covers the case in which the pieces 2 comprise another thermoformable material which can be injected into a tool by an injection molding method, as well as the manufacturing S of pieces 2 which are not necessarily intended to be integrated into a gas turbine engine.

The piece 2 can in particular be a static vane (guide vane, nozzle vane), a movable vane (fan vane), or else a casing.

Here, the piece 2 is made of a composite material, i.e. the component material of which comprises a fiber reinforcement densified by a matrix. The fiber reinforcement of the piece 2 comprises fibers, particularly of carbon, glass, aramid or ceramic. The matrix, meanwhile, is typically a polymer matrix, for example made of epoxy, bismaleimide or polyimide.

If the piece 2 is a casing, the fiber reinforcement can for example be formed by winding on a mandrel of a fiber texture made by three-dimensional weaving with variable thickness in accordance with the description of the application FR 2 913 053, the fiber reinforcement then forming a complete fiber preform of the casing formed of a single piece 2 with reinforcement pieces corresponding to the flanges.

The coating 3 can comprise a thermosetting material, such as injectable polyurethane materials or elastomer materials of polysulfide rubber, self-adhesive silicone, polyurethane such as adiprene, or else epoxy primers, epoxy paints, polyurethane or epoxy varnishes, or thermoplastic materials.

These pieces 2 have complex geometry, and are generally made by injection of the polymer matrix into an adapted tool wherein the fiber reinforcement has been disposed beforehand. To do this, the piece 2 can in particular be made in accordance with the following steps S2:

introduction and heating of the materials to be injected into the tool 1. For example, the materials can take the form of granulates and be fed into a rotating plasticizing screw, the barrel of which is heated to an adapted temperature.

injection of the material under pressure into the tool 1, then maintaining of the pressure into the tool in order to avoid any removing of the material upon cooling.

cooling of the piece 2 then removal.

These steps being known to those skilled in the art, they will not be further detailed below.

In order to be able to apply to the finished piece 2 a layer of coating 3 of a adapted thickness in a robust and reproducible manner, the invention proposes to overinject the coating 3 directly onto the piece 2 into the tool 1 used for manufacturing said piece 2. To this purpose, the tool 1 comprises:

a first molding piece, or impression 10, adapted for molding a first face of the piece 2, a second molding piece, or impression 20, adapted for molding a second face of the piece 2, and a holding element 30, adapted to hold the piece 2 in position throughout the method.

The holding element 30 makes it possible to position the piece 2 into the tool whatever the respective position of the impressions 10, 20 during the overinjection of the coating on the piece 2. It is thus possible to easily control the thickness e, e' of the coating applied onto the piece into the tool 1 by way of the clearance between each impression 10, 20 and the piece 2. For this purpose, the holding element 30 can in particular comprise two parts 30a, 30b, configured to cooperate in order to at least partly grip the piece 2 and hold it in position into the tool 1. For example, in the exemplary embodiment illustrated on the figures, the parts 30a, 30b of the holding element 30 comprise jaws adapted for engagement with one end of the fiber reinforcement forming the piece 2. In this way, the fiber reinforcement is held in position into the tool 1, whereas its first and second impressions are facing the first and second impressions 10, 20 respectively.

The first impression 10, the second impression 20 and the holding element 30 together define an inner volume of the tool 1 able to receive the piece 2.

Moreover, the holding element 30 can further be formed in such a way as to come into sealing contact with the impressions 10, 20. The term "sealing contact" should be understood to mean that during the employment of the tool 1 in order to make the piece 2, the injected material remains contained into the tool 1, without leakage between the impressions 10, 20 and the holding element 30.

The inner volume of the tool 1 can therefore be modified in order to create a space e and/or e' between the piece 2 and the impressions 10, 20 of the tool 1 intended to receive the protective coating 3 of the piece 2. For this purpose, the holding element 30 and/or at least one of the first impression 10 and the second impression 20 are movable in relation to one another between a molding position, in which the piece 2 is manufactured into the tool, and a coating position, in which one injects into said tool 1 the coating 3 on the piece 2 thus manufactured. In the following text, the term "movable pieces" should be understood to mean the piece(s) among the holding element 30 and the impressions 10, 20 which is or are displaced in order to modify the inner volume of the tool 1.

Preferably, in the relative displacement of the holding element 30 and the impressions 10, 20 in question, the contact between the holding element 30 and the two impressions 10, 20 remains sealed in order to avoid any leak and to optimize the coating 3 of the piece 2.

It will be noted that, so that it can be used as a tool 1 for manufacturing pieces 2 by injection molding, the tool 1 comprises the usual means of a tool for injection molding (not illustrated on the figures). In particular, the tool 1 can comprise an injection channel, comprising a plasticizing screw and barrel configured to soften and drive the material to be injected into the tool 1, a driving member 14, 24 of motor type (hydraulic for example) configured to drive the plasticizing screw rotationally, or else a press (for example hydraulic) adapted for applying and controlling the internal pressure of the tool 1.

To make it possible to unglue the mobile pieces 2 and to create the space(s) e, e' intended to receive the coating 3, it is possible to apply a silicone or demolding product to the molding walls of the tool 1 that are in contact with the piece 2. However, these products can be polluting, and further risk reducing the adhesion of the coating 3 onto the piece 2 by microtransfer of the product onto the piece 2 prior to the step S4 of injection of the coating 3. It is therefore preferable that the molding walls of the movable pieces, namely the impressions 10, 20 and/or the holding element 30, be made of a self-releasing material such as Teflon.

To achieve relative motion of at least one impression 10, 20 and/or the holding element 30, the tool 1 can comprise a return means 12, 22, extending between this impression 10, 20 and the holding element 30. The return means 12, 22 is configured to urge the impression 10, 20 and the holding element 30 away from one another (or toward one another respectively according to the type of return means 12, 22 chosen). The tool 1 further comprises a member 14, 24, adapted for applying a force F1, F2 to the impression 10, 20 or the holding element 30 and urging them toward one another (or respectively away from one another, according to the type of return means 12, 22 chosen).

The respective displacements of the movable pieces of the tool 1 are preferably translational movements, in order to obtain a coating 3 of constant thickness e, e' on each face of the piece 2. For example, the return means 12, 22 can be a compressive spring extending between the impression 10 and the holding element 30 and configured to urge them away from one another along the direction X of displacement, while the member 14, 24 can be a hydraulic or pneumatic cylinder, configured to urge them toward one another along this same direction X of displacement.

Here, the holding element 30 is fixed, while the at least one impression 10, 20 is movable. The spring 12, 22 thus tends to move the impression 10, 20 away from the holding element 30, while the cylinder 14, 24 tends to move it toward the holding element 30.

According to an embodiment, the first impression 10 and the second impression 20 are movable in relation to one another and in relation to the holding element 30. For example, the holding element 30 can be fixed, whereas the two impressions 10, 20 are movable in relation to the holding element 30. This embodiment has the advantage of holding the holding element 30 fixed in relation to the rest of the tool 1 and guaranteeing the correct positioning of the fiber preform in relation to the tool 1 and to the impressions 10, 20, and thus the thickness e, e' of the coating 3.

In this embodiment, the tool 1 then comprises one return means 12, 22 and one member 14, 24 per impression 10, 20. Both impressions 10,20 are then movable away from one another and toward one another in relation to the holding element 30 over a distance equal to the thickness e, e' desired for the coating on each face of the piece 2. For example, the first and the second impression 20 can displace along a same course X, but in opposite directions. On the figure diagrams, the force applied by the member 14, 24 on the impressions 10, 20 is symbolized by the arrows F1, F2.

The first 10 and the second impression 20 comprise at least a first 16 and a second 26 sealing face respectively, adapted for coming into contact with at least one wall 36 facing the holding element 30. In order to seal the contact between the impressions 10, 20 and the holding element 30, the tool 1 can comprise at least one seal 18, 28, extending between each sealing face 16, 26 and the wall 36 facing the holding element 30. Thus, in an exemplary embodiment, the tool 1 can comprise three seals 18 between the first sealing face 16 and the wall 36, and three seals 28 between the second sealing face 26 and the wall 36. The tool 1 is therefore sealed whatever the respective position of the impressions 10, 20 and the holding element 30.

Each of the impressions 10, 20 can comprise a housing 15, 25, adapted for at least partly receiving the holding element 30. The holding element 30 then extends between the two impressions 10, 20. In this embodiment, the sealing faces 16, 26 can then consist of one of the faces of the housing 15, 25. Moreover, each part 30a, 30b of the holding element 30 extends facing one of the impressions 10, 20.

Figure 2:
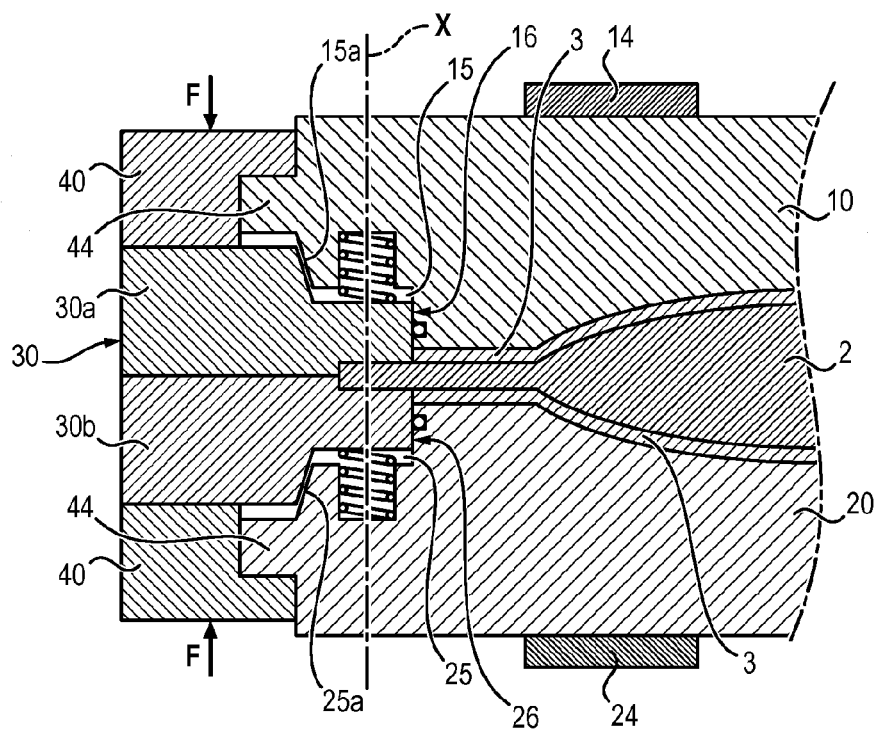
FIG. 2 is a schematic section view of an exemplary embodiment of the tool in FIG. 1, in the final position, in order to apply the coating onto the piece.

For example, FIGS. 1 and 2 illustrate a tool 1 comprising two impressions 10, 20 movable in relation to the holding element 30, said impressions 10, 20 each comprising a housing 15, 25 adapted for receiving the holding element 30. Each of the housings 15, 25 forms two cavities of different volume separated by a separating wall 15a, 25a, and comprises in succession: a first bottom wall 16, 26 and a first side wall forming the first cavity having a first inner volume, the separating wall 15a, 25a, then a second bottom wall and a second side wall forming the second cavity having a second inner volume, wider than the first inner volume. Similarly, the holding element 30 of the piece 2 comprises a first bulge, adapted to abut the walls of the first cavity and a second bulge adapted to abut the walls of the second cavity, the second bulge being wider than the first.

The first bottom wall 16 and/or the second bottom wall 26 of each cavity can form the sealing face of the corresponding impression 10, 20.

In this form of embodiment, the return means 12, 22 can then be disposed in the housings 15, 25. For example, each housing 15, 25 can comprise an orifice formed in its first or in its second side wall, extending along the direction X of displacement of the impressions 10, 20 and adapted to receive one of the return means 12, 22.

In a variant, only one of the impressions 10, 20 can comprise such a housing 15, 25, and where applicable an orifice intended to receive the return means 12, 22.

In order to adjust the thickness of the material injected into the tool 1 on each face of the piece 2, the track of the movable pieces (whether it be the holding element 30 and/or one or other of the impressions 10, 20) can be limited by at least one outer end stop 40, configured in such a way as to stop the displacement of the movable pieces when the desired spaces e, e' between the piece 2 and the movable pieces 10, 20 are reached. Indeed, the displacement of the movable pieces makes it possible to create spaces e, e' facing each of said pieces 10, 20 intended to receive the coating 3 material. By mechanically controlling the displacement of the movable pieces, the volume intended to receive the coating 3 material, and therefore the coating 3 thickness, are controlled precisely and reproducibly.

Thus, if the first and the second impression 20 are movable in relation to the holding element 30, the tool 1 can comprise an outer end stop 40 at each of the impressions 10, 20, configured so that the track of the impression 10, 20 between its initial position, in which the piece 2 is molded, and its final position, in which the coating 3 is injected on the piece 2 already molded, is equal to the desired thickness, e, e' respectively for the coating 3.

For example, for a fan vane made of composite material, the desired thickness e, e' of the coating 3 is between 0 mm and 3 mm. The track of the impressions 10, 20 is therefore between 0 mm and 3 mm.

In the exemplary embodiment illustrated, each impression 10, 20 of the tool 1 is movable in relation to the holding element 30 and onto the piece 2, which remains fixed into the tool 1. The outer end stops 40 can therefore be fixed in relation to the holding element 30, and each comprise a recess 42 adapted for receiving a protrusion 44 of the corresponding impression 10, 20. For example, the protrusion 44 can comprise a front face 44a, adapted for abutting a bottom wall 42a of the recess 42. The front face 44a and the bottom wall 42a are parallel to the direction of displacement of the movable pieces, and have a clearance in order to allow this displacement. The protrusion 44 further comprises a side face 44b, extending facing a side wall 42b of the recess 42, and adapted to abut against said wall 42b when the movable pieces are moved away from one another to create the spaces e, e' adapted to receive the coating 3. The side face 44b and the side wall 42b therefore extend globally perpendicular to the direction X.

The manufacturing of the piece 2 and the application S of the protective coating 3 onto the piece 2 using this tool 1 can then be carried out as follows.

In a first step S1, the tool 1 is put in position for the manufacturing of the piece 2. To do this, the movable pieces (one at least of the impressions 10, 20 and/or the holding element 30) are positioned in order to delimit the cavity adapted for forming the piece 2. For example, in the example illustrated in the figures, the impressions 10, 20 are urged toward one another in order to reduce the inner volume of the tool 1 by applying a pressure in the direction X using the member(s) 14, 24.

In a variant, the tool 1 can already be in position. It is then not necessary to displace the impressions 10, 20 or the holding element 30.

Moreover, in the case of a piece 2 made of composite material, comprising a fiber reinforcement densified by a matrix, the fiber reinforcement of the piece 2 is positioned beforehand into the tool 1 during step S1, between the two impressions 10, 20. For this purpose, the fiber preform of the piece 2 can notably be positioned between the two parts 30a, 30b forming the holding element 30, so that said parts 30a, 30b hold the preform in position into the tool 1.

In a second step S2, the piece 2 is manufactured conventionally by injection molding of its component material into the tool 1.

Following the manufacturing of the piece 2 and its cooling S2, it can remain in the mold in order to receive the protective coating 3. In a variant, the piece 2 can be removed to undergo related operations, then reintroduced into the tool 1.

In an embodiment, the matrix of the piece 2 can be injected with a degree of polymerization less than 100%, for example between 60% and 100% according to the injected matrix, in order to guarantee the cohesion between the piece 2 and the coating 3 that it is intended to receive. In this case, the polymerization of the piece 2 is completed upon the application of the coating 3 during the fourth step S4 of the method. Advantageously, the polymerization of the piece 2 in two operations makes it possible to improve the adhesion of the coating 3 onto the piece 2, particularly when the surface of the impressions 10, 20 of the tool 1 has low roughness.

Then, in a third step S3, the tool 1 is put in position for the application of the coating 3 on the piece 2.

The movable pieces are displaced, in order to increase the inner volume of the tool 1 and to create the space(s) e and/or e' intended to receive the coating 3 material. The holding element 30 and the piece 2, on the other hand, preferably remain fixed into the tool 1. For this, the pressure applied by the members 14, 24 to the movable pieces is sufficiently reduced, or even eliminated, to allow the return means 12, 22 to displace the movable pieces. The force F1, F2 applied by the return members 14, 24 is then less than that applied by the springs to the movable pieces. In parallel, the piece 2 is held in position into the tool 1 using the holding element 30, which makes it possible to obtain a very precise coating thickness e, e'.

According to an embodiment, prior to the elimination of the force F1, F2 of the members 14, 24 on the movable pieces, it is possible to exert a force F on the outer end stops in order to hold them in position in relation to the holding element 30 and to hold the holding element 30 flanged along the axis X. Indeed, this force F makes it possible to guarantee the relative position of the outer end stops 40 in relation to the holding element 30 and therefore of the piece 2 into the tool 1 in spite of the displacement of the movable pieces generated by the return means 12, 22, and therefore a thickness well defined for the coating 3. Specifically, the force F makes it possible to counter the forces on the piece 2 in the overinjection step S4.

The tool 1 is then in position to apply a layer of coating 3 onto the piece 2. Owing to the sealing contact between the impressions 10, 20 and the holding element 30, and particularly the seals 18, 28, the tool 1 is closed and sealed, which makes it possible to avoid any leakage of material and to apply a stable given pressure.

In a fourth step S4, the coating 3 is applied onto the piece 2 into the tool 1 uniformly and reproducibly, following a conventional injection molding method.

Thus, the coating 3 material is introduced and heated into the tool 1, preferably via the same injection channel as that used for the matrix of the piece 2. In a variant, the tool can comprise a dual injection channel in order to reduce the complexity of the tool. The coating 3 material is then injected under high pressure into the tool 1 comprising the piece 2, sealingly closed. Upon injection, the material penetrates via the injection channel into the spaces e, e' created between the piece 2 and the impressions 10, 20 respectively by the displacement of the movable pieces of the tool 1, in such a way as to cover each face of the piece 2 uniformly and to penetrate into the surface irregularities of the piece 2, notably owing to the pressure applied by the tool 1 press.

Optionally, the pressure can then be kept up for a determined duration into the tool 1, in order to avoid the withdrawal of the coating 3 material during the cooling step.

Where applicable, if the degree of polymerization of the piece 2 was less than 100% in the first step, the polymerization of the piece 2 is completed S5.

Finally, the coating 3 is cooled S6 then removed S7 from the tool 1, by conventional means.

Where applicable, the piece 2 provided with its coating 3 can then undergo finishing operations, such as operations of machining, deburring, etc. in order to eliminate any excess thicknesses due for example to the manufacturing tolerances of the injection molding method.

The tool 1 can then be put back into its initial position S1, by application of a force F1, F2 to the movable pieces by the member(s) 14, 24, in order to make a new piece.

The method S and the tool 1 described above thus make it possible to obtain a regular coating 3, having homogeneous thickness and a better-quality surface appearance than using conventional methods. Moreover, they do not require any additional equipment other than the manufacturing tool 1 (minimization of the usual manual operations consecutive to the manufacturing of the piece, since no surface preparation or painting is necessary) while being more environmentally friendly (no volatile emanations and reduction in the number of consumables used).

The invention claimed is:

1. A tool for manufacturing a piece and applying a coating to said piece by injection molding, wherein said piece is made of composite material comprising a fiber reinforcement densified by a matrix, the tool comprising:

a first impression, adapted for molding a first face of the piece, and a second impression, adapted for molding a second face of the piece, and an element for holding the piece, adapted for holding the fiber reinforcement of the piece in position into the tool, the first impression, the second impression and the holding element together defining an inner volume of the tool, the tool being characterized in that the holding element and at least one of the first impression and the second impression are movable in relation to one another, in such a way as to modify the inner volume of the tool between a molding position, in which the piece is manufactured in the tool, and a coating position, in which the coating is injected in said tool onto the piece thus manufactured, the fiber reinforcement of the piece being held in position by the holding element in the tool whatever the molding position.

2. The tool according to claim 1, wherein the holding element is in sealing contact with the first impression and the second impression whatever the molding position, and in that the first impression and the second impression are movable in relation to one another and the holding element is fixed into the tool, in such a way as to modify the inner volume of the tool.

3. The tool according to claim 1, wherein:
the first impression comprises at least a first sealing face,
the second impression comprises at least a second sealing face, and
the holding element comprises at least a wall, extending facing the first sealing face and the second sealing face,
the tool further comprising at least a seal extending between each sealing face and the wall facing the holding element.

4. The tool according to claim 1, wherein at least one of the first impression and the second impression is movable in relation to the holding element between:
the position of molding of the piece, in which said impression is abutting against the holding element, so that the inner volume of the tool is minimal, and
the position of coating of the piece, in which said impression is moved away from the holding element, so that the inner volume of the tool is greater than its minimal volume, the track of the impression being limited by an outer end stop.

5. The tool according to claim 4, further comprising a return means adapted for applying a force to the impression which is movable in relation to the holding element in order to displace said impression from its molding position to its coating position.

6. The tool according to claim 5, wherein the first impression and the second impression each comprise a housing adapted for at least partly receiving the holding element, the return means being a spring housed in an orifice of the housing of the impression movable in relation to the holding element.

7. The tool according to claim 5, further comprising a member configured to apply a force to the impression movable in relation to the holding element, said force being in the opposite direction to a force of the return means in order to displace said impression from its coating position to its molding position.

8. A method for manufacturing a piece by injection molding in a tool according to claim 1, wherein said piece is made of composite material comprising a fiber reinforcement densified by a matrix,
the method comprising the following steps:

positioning the fiber reinforcement of the piece in the holding element of the tool, manufacturing the piece by injection molding into the tool, the first impression, the second impression and the holding element being in position for the manufacturing of the piece, displacing at least one of the first impression and the second impression and/or the holding element in order to modify the inner volume of the tool, and create between the piece obtained following the manufacturing step and the tool a non-zero space, and injecting onto the piece in the space the constituent material of the coating.

9. The method according to claim 8, wherein in the displacement step, the first impression and/or the second impression is displaced, the holding element and the piece remaining fixed into the tool.

* * * * *